United States Patent
Kalogeraki et al.

(10) Patent No.: US 7,243,091 B2
(45) Date of Patent: Jul. 10, 2007

(54) SEARCH NETWORK FOR SEARCHING SERVICES ON THE INTERNET

(75) Inventors: Vasiliki Kalogeraki, Sunnyvale, CA (US); James C. Pruyne, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 799 days.

(21) Appl. No.: 10/135,906

(22) Filed: Apr. 29, 2002

(65) Prior Publication Data

US 2003/0204497 A1 Oct. 30, 2003

(51) Int. Cl.
*G06F 17/30* (2006.01)

(52) U.S. Cl. .................. 707/3; 707/5; 707/10; 707/200; 707/101

(58) Field of Classification Search .................... 707/3, 707/4, 10, 6, 5; 709/202, 219
See application file for complete search history.

(56) References Cited

U.S. PATENT DOCUMENTS

| | | | | |
|---|---|---|---|---|
| 5,224,205 A | * | 6/1993 | Dinkin et al. ............... 709/226 |
| 5,819,273 A | * | 10/1998 | Vora et al. ..................... 707/10 |
| 5,943,666 A | * | 8/1999 | Kleewein et al. ............... 707/2 |
| 5,974,409 A | * | 10/1999 | Sanu et al. ..................... 707/3 |
| 6,085,176 A | * | 7/2000 | Woolston ...................... 705/37 |
| 6,122,648 A | * | 9/2000 | Roderick ..................... 707/513 |
| 6,463,586 B1 | * | 10/2002 | Jerding .......................... 725/37 |
| 6,662,182 B1 | * | 12/2003 | Lerene et al. ................. 707/10 |
| 6,745,185 B2 | * | 6/2004 | Lee et al. ....................... 707/6 |
| 2001/0051975 A1 | * | 12/2001 | Ohtani et al. ............... 709/202 |
| 2002/0112034 A1 | * | 8/2002 | Feik ............................ 709/219 |
| 2003/0018799 A1 | * | 1/2003 | Eyal ............................ 709/231 |

* cited by examiner

Primary Examiner—Cam-Y Truong

(57) ABSTRACT

A service search network system includes a plurality of file search nodes. Each file search node has a file repository that stores files searchable by a file search request. A first and a second service search node is provided, each having a service repository for storing services that can be searched. When the first service search node receives a service search request for a particular service stored in the second service search node, the first service search node formats the service search request into a format recognized by the file search nodes such that the service request can be propagated to the second service search node via some of the file search nodes. The structure of each service search node is also described. A method of searching a specific service in a search network having file search nodes and service search nodes is also described.

18 Claims, 7 Drawing Sheets

SEARCH NETWORK FOR SEARCHING SERVICES ON THE INTERNET

BACKGROUND OF THE INVENTION

1. Field of the Invention

The present invention pertains to searches within the Internet. More particularly, this invention relates to an improved search mechanism for searching services (e.g., electronic services) on the Internet.

2. Description of the Related Art

As is known, searching for information, such as computer files or MP3 music files, on the Internet is traditionally done in a centralized fashion. This means that the provider of a file registers the file at some central database. All search requests for the file are directed to the central database. However, as the number of files and the number of file providers increase, the disadvantages of the centralized searching mechanism becomes more and more obvious. For example, as the central database grows, the response time to a search request increases accordingly. Another disadvantage is that it is typically difficult to scale the database when there is a large number of files and/or file providers. Additionally, it is typically difficult for a centralized database to keep track of all the files and their updates. Efforts are also needed for file providers to register their files at the central database.

Prior art solutions have been made to decentralize the file searching mechanism. FIG. 1 schematically illustrates one such prior art scheme. As can be seen from FIG. 1, the search network 10 is a decentralized one that includes a number of search nodes 11–13, each having a local file repository (i.e., 11a, 12a, or 13a). Each file repository stores files registered with the corresponding search node. Each of the nodes 11–13 performs two basic functions. One is to check its local file repository in accordance with a search query message received. The other is to forward query messages to other search nodes. In other words, the network 10 propagates search queries for files among a number of search nodes with each node responding to the queries for files that it has stored locally at its local file repository. New search nodes can be joined into the network 10 at any time, making their files available to all other nodes while also helping to propagate search queries.

As the Internet advances, the electronic services (i.e., E-services) technology has also evolved into a run-time composition of Internet-connected services from object-based or component-based software. This means that the E-services offered today are modular, nimble, electronic services available via the Internet that work together to perform a task, solve a problem, or complete a transaction. In order to work together, E-services must first be able to discover one another's presence on the Internet, and obtain the information needed to successfully invoke one another. Thus, composition of E-services typically requires methods for describing services, methods for creating repositories of service instances, and the ability of querying those repositories for the service instances. This means that a search mechanism is needed to allow discovery of E-services.

One prior art approach of searching or discovering E-services on the Internet is the centralized approach similar to the one described above. This means that a centralized database is required to register and store descriptions of all the E-services provided. However, this centralized database is difficult to scale when there is a large number of E-services and/or service providers. In addition, the centralized database is typically not capable of keeping up with the dynamic nature of E-service providers. If an E-service is no longer offered while it is still registered with the central database, the service will be found but cannot not be used. A service provider must register its service at the central database so that the service can be discovered. Just as a centralized web search engine is unable to keep track of all web pages available and unavailable at any given moment, so too are the centralized E-service repositories unable to keep up with the large set of services and their providers at any given time. Moreover, if the central database is not operating, then no search can be conducted.

On the other hand, the prior art decentralized file search network 10 shown in FIG. 1 cannot be applied to search E-services. This is due to the fact that the network 10 is only limited to file searches (e.g., music files or computer files). This is due to the fact that a file search query message contains insufficient information to search for a service. The query message only contains the name information of a file. To search for a particular service, a description of the service must be provided in the query message.

In addition, each of the nodes 11–13 of the network 10 can only process and propagate query messages for files, not services. This restriction is typically caused by the fact that each of the nodes is structured to apply only to a specific domain (e.g., music files or computer files).

SUMMARY OF THE INVENTION

One feature of the present invention is to allow searches for services (e.g., E-services) in a search network that includes file search nodes.

Another feature of the present invention is to provide a service search node that formats a service search request into a format recognized by file search nodes coupled to the service search node such that the formatted service search request can be propagated to another service search node via the file search nodes.

In accordance with one embodiment of the present invention, a service search network system is described. The system includes a plurality of file search nodes coupled together. Each of the search nodes has a file repository that stores files searchable by a file search request. A first and a second service search node is provided, each having a service repository for storing services that can be searched. When the first service search node receives a service search request for a particular service stored in the second service search node, the first service search node formats the service search request into a format recognized by the file search nodes such that the request can be propagated to the second service search node via some of the file search nodes.

In accordance with another embodiment of the present invention, a method for searching services in a search network having file and service search nodes is described. The method includes the step of receiving a service search request for a specific service in a first service search node associated with one of the file search nodes. The service search request is then formatted, in the first service search node, into a format recognized by the file search nodes. The formatted service search request is then propagated to a second service search node via some of the file search nodes. The second service search node contains a service repository that stores the specific service.

DETAILED DESCRIPTION OF THE INVENTION

Figure 1:
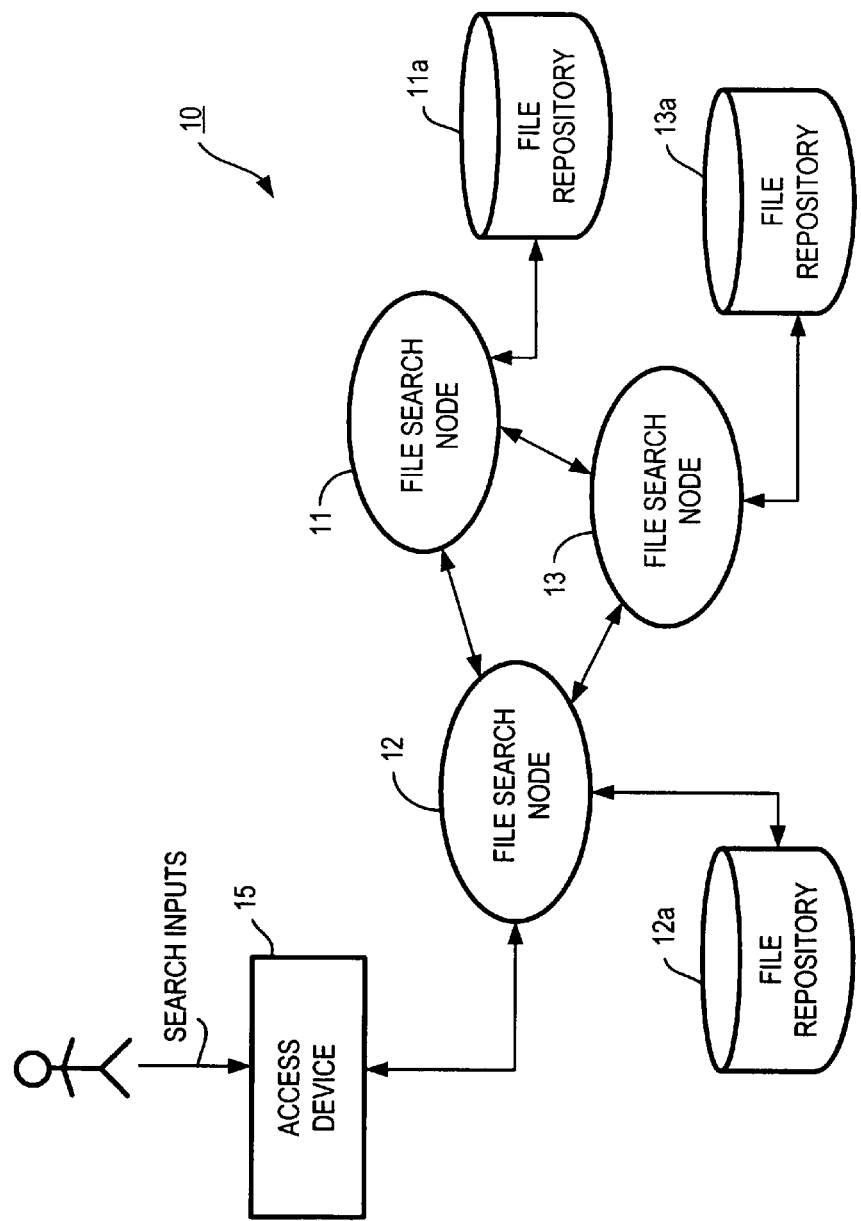
FIG. 1 shows a prior art peer-to-peer file search network.
Figure 2:
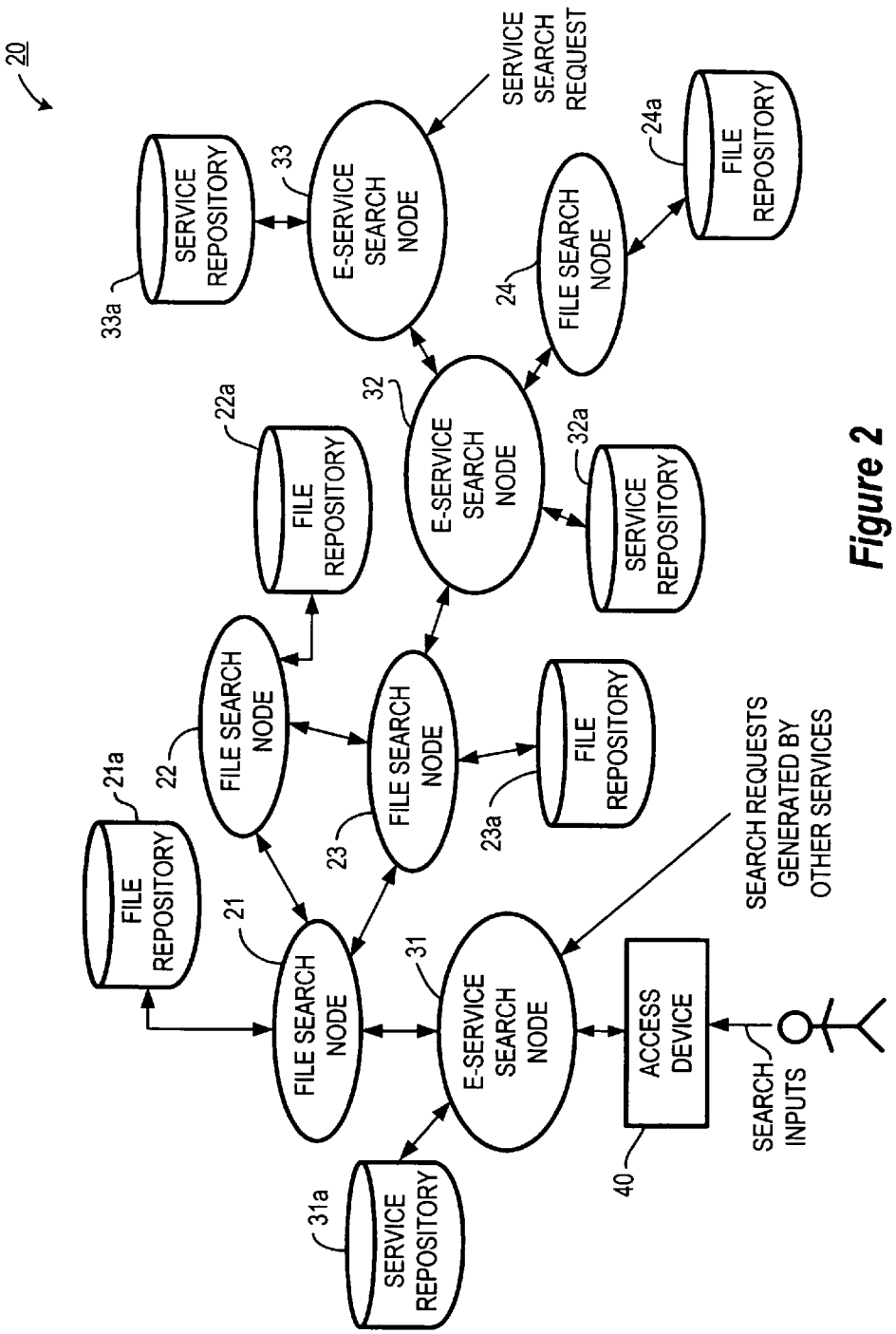
FIG. 2 shows a search network that can search services (e.g., E-services) in accordance with one embodiment of the present invention, wherein the search network is formed by peer-to-peer file search nodes and service search nodes.

FIG. 2 shows a service search network system 20 that implements one embodiment of the present invention. As can be seen from FIG. 2, the service search network system 20 includes service search nodes (31–33) and file search nodes (21–24) connected together.

In accordance with one embodiment of the present invention and as will be described in more detail below, the service search network system 20 allows for searches for services (e.g., E-services) in addition to searches for files. This is accomplished by formatting each service search query message in each of the service search nodes 31–33 into a format recognized by the file search nodes 21–24. The formatting can just be producing a wrapper or header that makes the contents of the service search query message appear to be a file search query message. This allows the file search nodes 21–24 to propagate the formatted service search query message to other service search nodes even though the file search nodes 21–24 cannot respond to the formatted service search query message.

However, when a service search node receives a formatted service search query message, it can re-construct the formatted message into the original service search message (e.g., by deleting the wrapper or header). In this way, the service search network system 20 allows for both files and services to be searched and discovered. This also means that each of the service search nodes 31–33 does not need to know whether its connected node is a service search node or not.

The service search network system 20 in accordance with one embodiment of the present invention provides a decentralized search mechanism with the properties required for successfully searching for services. In this search network system 20, there is no centralized point of failure and no centralized update required. In addition, the service search network system 20 overcomes an essential problem with building a user base which will participate in the network of service searches. This is done by taking advantage of existing file search nodes or file search networks. The service search network system 20 and each of the service search nodes 31–33 will be described in more detail below, also in conjunction with FIGS. 2–7.

Referring to FIG. 2, the service search network system 20 is shown in abstract form. Here, the term "abstract" indicates that what is shown in FIG. 2 is a just general structure. The actual implementation of that general structure may vary.

In FIG. 2, the service search network system 20 is shown to only include the file search nodes 21–24 and the service search nodes 31–33. This is for illustration purpose only. In practice, the service search network system 20 may include more or fewer file and/or service search nodes than those nodes shown in FIG. 2, and may be configured differently than shown. For example, the service search node 31 may be connected to the file search node 23 or the service search node 32 in addition to being connected to the file search node 21.

Each of the file search nodes 21–24 is capable of searching computer files (e.g., text, audio, or image files) in response to file search requests or query messages. In addition, the file search nodes 21–24 are not capable of handling and responding to any service search requests or query message for services. If these service search query messages are formatted into the format of the file search query messages, the file search nodes 21–24 can propagate these formatted service search query messages even if they cannot successfully respond to these query messages.

As can be seen from FIG. 2, each of the file search nodes 21–24 includes a local file repository (e.g., 21a–24a). Each of the file repositories 21a–24a is used to store files associated with its file search node. For example, the file repository 21a is used to store files associated with the file search node 21 and the file repository 24a stores files associated with the file search node 24. This means that files are stored and updated locally in each of the file search nodes 21–24.

Each of the nodes 21–24 performs two basic functions. One is to check its local file repository in accordance with a file search query message received. The other is to forward query messages to other search nodes. This means that when a file search node receives a file search query message, that file search node accesses its corresponding local file repository to locate the matching file, if any.

In addition, the file search node also forwards the file search query message to other file search nodes so that the requested file can be discovered. In other words, each of the file search nodes 21–24 propagates search queries for files among a number of search nodes with each node accessing its local file repository to determine if it stores the requested file. New file search nodes can be joined into the network 20 at any time, making their files available to all other nodes while also helping to propagate search queries. The structure of each of the file search nodes 21–24 (and its corresponding file repository) is similar to that of each of the file search nodes 11–13, and thus will not be described in more detail below.

The file search query message is generated by a user through a user interface (not shown) of an access device (also not shown) connected to a file search node. During operation, a file search node generates a file search query based on the user request or inputs and submits the query message to the network 20 via its connected file search node. Each file query message describes a file for which the user is looking. For example, a user at an access device connected to the file search node 21 can submit a file search request to the file search node 21 for a particular file. When the file search node 21 receives the request, it generates a file search query message which is then sent to the local file repository 21a to determine if the requested file is stored in the local file repository 21a. If a matching file is found in the repository 21a, the file is fetched and forwarded to the user by the file search node 21 via the access device. In addition, the file search node 21 propagates the query message to other file search nodes 22–24 so that these nodes can check their corresponding local file repositories to find any matching file of the file search query message.

On the other hand, each of the service search nodes 31–33 in FIG. 2 is capable of searching or discovering services (not files) in response to service search requests or query messages. Here, the term "service" indicates or refers to business or computing service offered via the Internet. One example of such service is the E-service. E-service represents the Internet-connected software structure that provides business or computing service. E-services are basically modular, nimble, electronic services available via the Internet that work together to perform a task, solve a problem, or complete a transaction.

In one embodiment, the services are E-services. In another embodiment, the services are computing or transactional services.

In addition, each of the service search nodes 31–33 includes an associated local service repository (e.g., 31a, 32a, or 33a). Each of the local service repositories 31a–33a stores services associated with the corresponding service search node. For example, the local service repository 31a stores services associated with the service search node 31 and the service repository 33a stores services associated with the service search node 33. Each of the service repositories 31a–33a can be accessed by its associated service search node. For example, the service search node 31 can access the service repository 31a to look for a requested service.

Each of the service repositories 31a–33a also stores the descriptive information of each of the service stored in the corresponding service repository. This allows the corresponding service to be discovered through service search query message. When a service is created in a local service repository, it advertises itself in the local repository. Likewise, when a service is ended, it removes itself from the corresponding repository. Because this is a local operation, the repository should easily be able to stay up-to-date with respect to the available services at any given time. In addition, there is no centralized point of failure because even if one of the local service repositories 31a–33a fails, the network system 20 can still function to allows for service searches.

Each of the services can be invoked by another service, or by a human searcher. The searcher can specify the requested service via an access device (e.g., the access device 40 in FIG. 2). The service search request is then transferred to the associated service search node. The service search node can also receive the service search request from a software program or another service that tries to invoke the requested or desired service.

To discover a service, the service search request must sufficiently describe the desired or requested service. Mere name of the requested service is not enough. The request must contain sufficient descriptive information (i.e., meta-data) of the requested service. For example, the meta-data must include such information as what interactions the service is capable of and how the service can be contacted (e.g., the service's network address and the name of the service).

When, for example, the service search node 31 receives a service search request, it generates a service search query message. Here, the service search node 31 can also be referred to as the requesting service search node since it generated the service search query message in accordance with service search request. The service search node 31 then sends the service search query message to its local service repository 31a to look for the requested service. The local service repository 31a returns a message, indicating whether the requested service is stored (i.e., by a query hit return message) in the local service repository 31a or not. If not, the service search node 31 will send the service search query message to other service search nodes (i.e., 32–33) via some of the file search nodes 21–24 of the network system 20.

The service search node 31 formats the service search query message into a format that is recognized by each of the file search nodes 21–24 before sending the query message to the network 20. This allows the file search nodes 21–24 to propagate the formatted service search query messages to other service search nodes in the network system 20, even though the file search nodes 21–24 cannot process and respond to the content contained in the query message.

Figure 5:
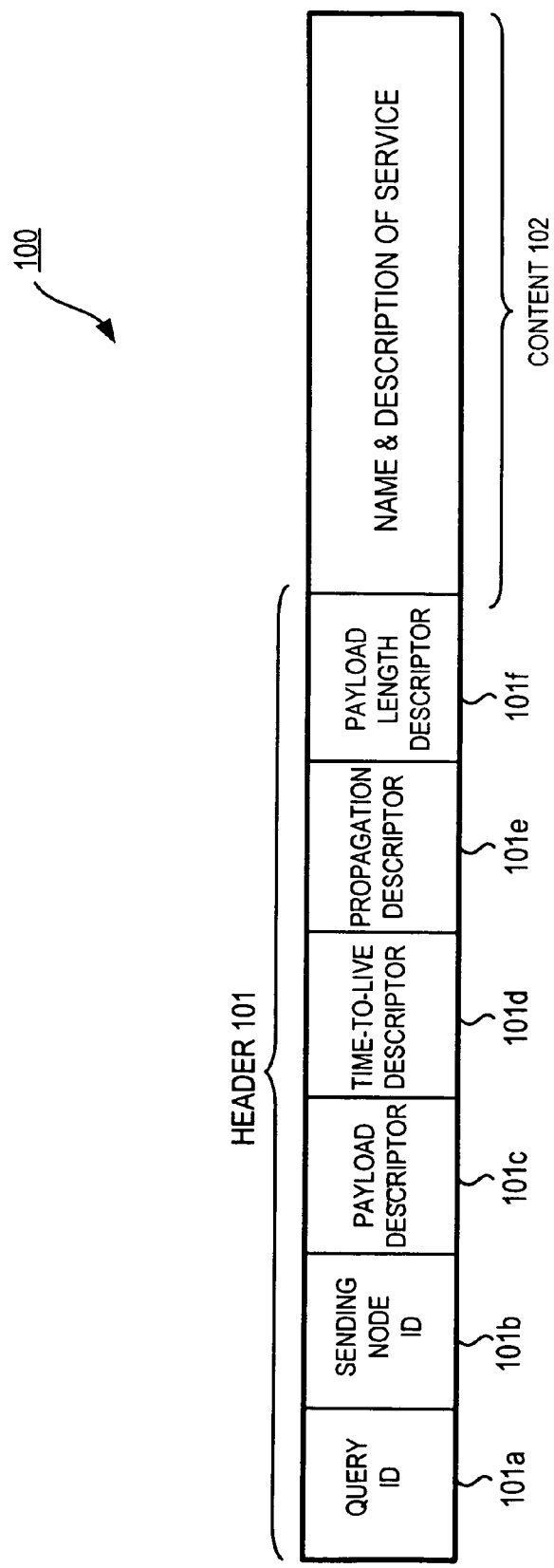
FIG. 5 shows the format of a formatted service search query message formatted by the formatting module of FIG. 3.

As described above, the format can just be adding a wrapper or header to the original service search query message. This will make the content of the service search query message appear to be a file search query message. FIG. 5 shows one such a format 100. As can be seen from FIG. 5, the format 100 includes a message header 101 and a content field 102. The content field 102 specifies the name and description of the requested service. This means that the original service search query message is in the content field 102. As for the message header 101, it also contains a query ID field 101a, a sending node (or requesting node) ID field 101b, a payload descriptor 101c, a Time-To-Live (TTL) descriptor 101d, a propagation descriptor 101e, and a payload length descriptor 101f. The query ID 101a uniquely identifies the formatted query message. The sending node ID 101b identifies the service search node that generated and formatted the service search query message. The payload descriptor 101c identifies whether the formatted query message is a search request query message, a query hit return message, or other message (e.g., a ping/pong message). For example, if the message is a query message, then the payload descriptor 101c specifies a "Query". If the message is a query hit return message, then the payload descriptor 101c indicates a "Query Hit".

The TTL field 101d indicates how many nodes the message need to be propagated in the search network. The propagation descriptor 101e indicates how many nodes the query message has propagated. The payload length descriptor 101f indicates the length of the content field 102.

Referring back to FIG. 2, when a service search node receives the propagated query message, that node is a responding node. For example, if the formatted query message is propagated to the node 32, the node 32 is a responding node because it needs to respond to the query message. The responding node then interprets or reconstructs the original query message from the formatted query message. This can be done by extracting the original query message from the content field of the formatted query message. The responding node then searches the local service repository of the responding node for the service described in the query message. If the local service repository contains the requested service, then a query hit message will be forwarded to the responding node. The responding node then extracts content from the query hit message, and constructs a query hit return message to the requesting node, following the same transmission path of the service search query message.

To construct the query hit message, the responding node causes (1) the payload descriptor in the message header of the query message to be changed. In addition, the responding node changes the TTL descriptor and the propagation descriptor in the message header. In addition, the responding node checks the message header of the message and, if the changed message header still indicates that the message needs to be forwarded, forwards the message to other nodes.

Figure 3:
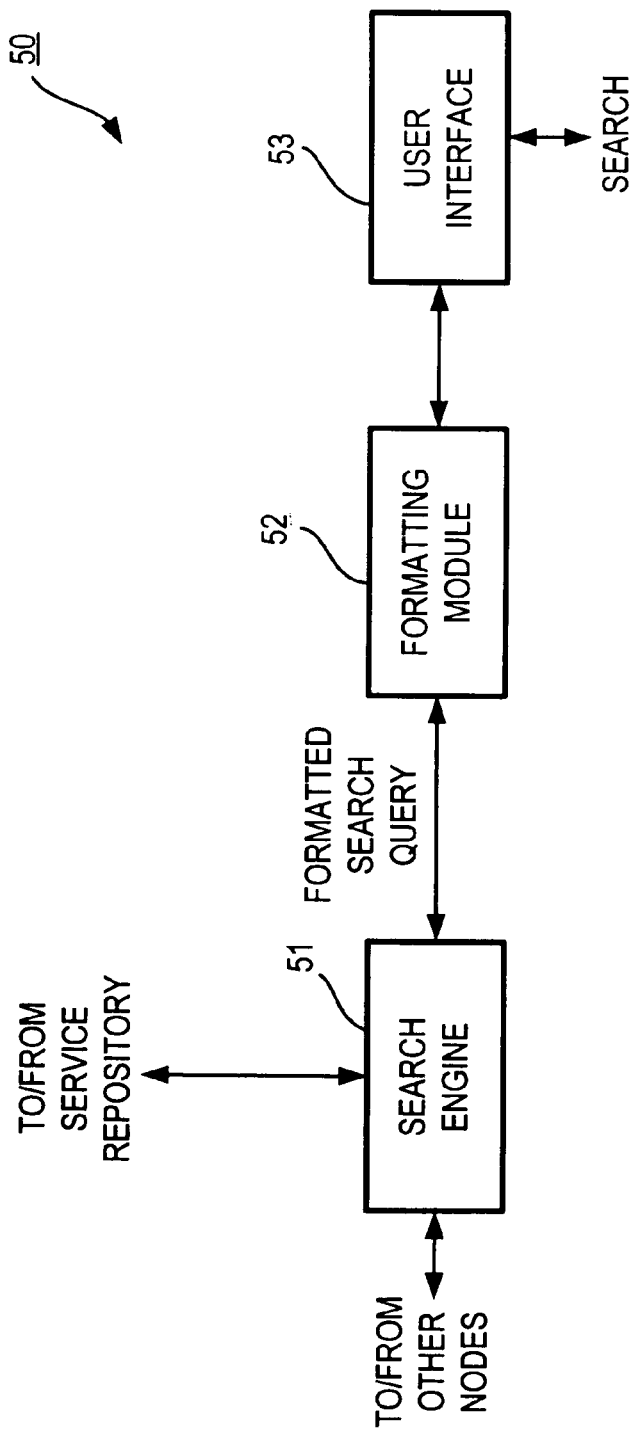
FIG. 3 illustrates the structure of one of the service search nodes of FIG. 2, wherein the service search node includes a user interface, a formatting module, and a search engine.

FIG. 3 shows the structure of service search node 50 that can be each of the service search nodes 31–33 of FIG. 2. As can be seen in FIG. 3, the service search node 50 includes a search engine 51, a formatting module 52, and a user interface (e.g., graphical user interface) 53. These modules 51–53 are connected together. Alternatively, the formatting module 52 is connected to the search engine 51 which is then connected to the user interface 53. In this case, the formatting module 52 interfaces with the other connected nodes of the network and the search engine 51 interfaces with its local repository.

The user interface 53 is responsible for receiving the service search request which is generated either by a user via an access device connected to the service search node, or by a requesting service or program that needs to invoke the requested service. The user interface 53 then generates the service search query message. As described above, a query message contains sufficient descriptive information of the requested service.

In addition and alternatively, the user interface 53 may also include an application programming interface (i.e., API) that allows a local service or program associated with the service search node to search for other services. In this case, the requested service can be discovered by the local service or program which is the requesting service or program (not a human user).

The formatting module 52 is used to format the service search query message into a format recognized by each of the file search nodes 21–24. FIG. 5 shows one such format. This means that the formatting by the formatting module 52 is to produce or add a wrapper or header to the query message. The formatting module 52 can be implemented using any known technology.

The search engine 51 is the main module of the node. It undertakes the responsibility of examining the formatted query message. In addition, the search engine 51 extracts search content from the formatted query message and sends the extracted content to the local service repository. Moreover, the search engine 51 constructs the query hit return message when the access to the local service repository results in a query hit. Furthermore, the search engine 51 forwards any query message or query hit return message it has received to the network. The search engine 51 can also be implemented using known technology.

Figure 4:
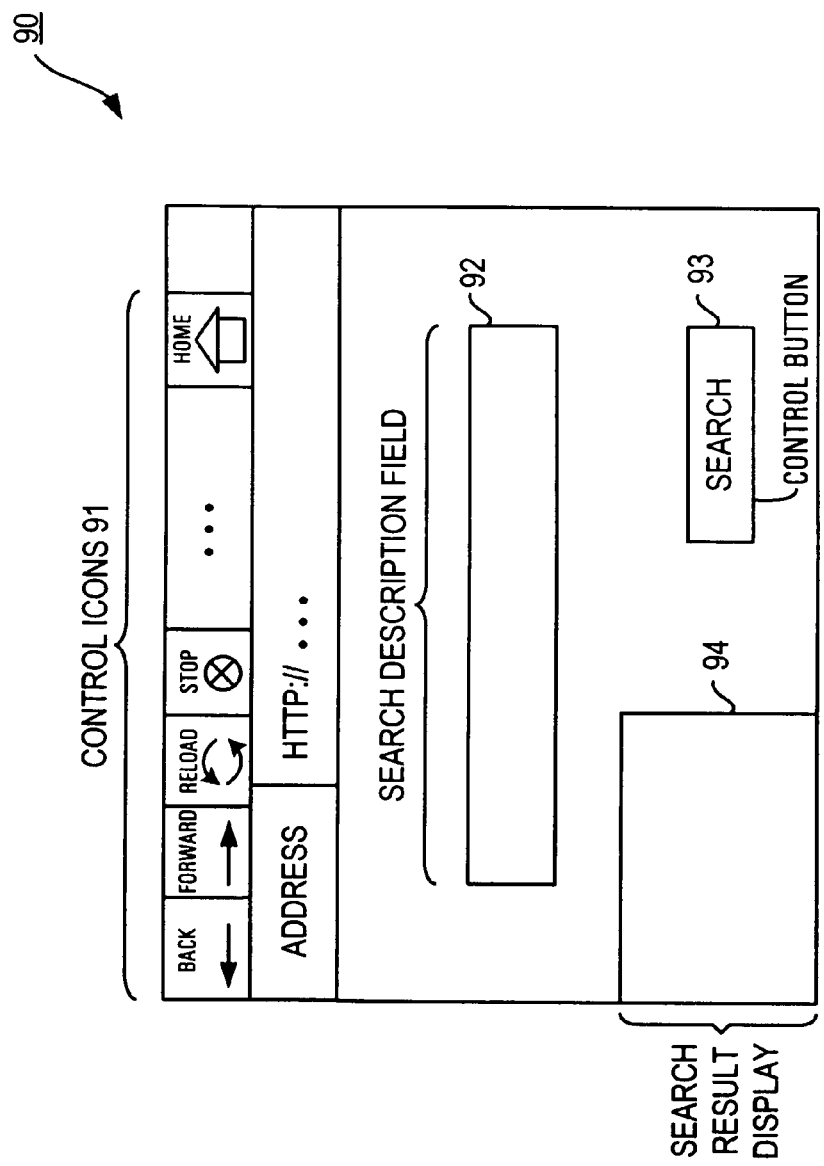
FIG. 4 shows the structure of the user interface of FIG. 3.

FIG. 4 shows in more detail the display format 90 of the user interface 53 of FIG. 3. As can be seen from FIG. 4, the display format 90 includes control icons 91 and a search description field 92. In addition, a search control button 93 is provided that, once clicked, allows the user interface 53 to generate the search query message. The display format 90 also includes a search result display 94 that can display the search result to the user. If the search query message is generated by another service, then the search result does not need to be displayed. In this case, the search result is directly sent to the requesting service for invoking the requested service.

Figure 6:
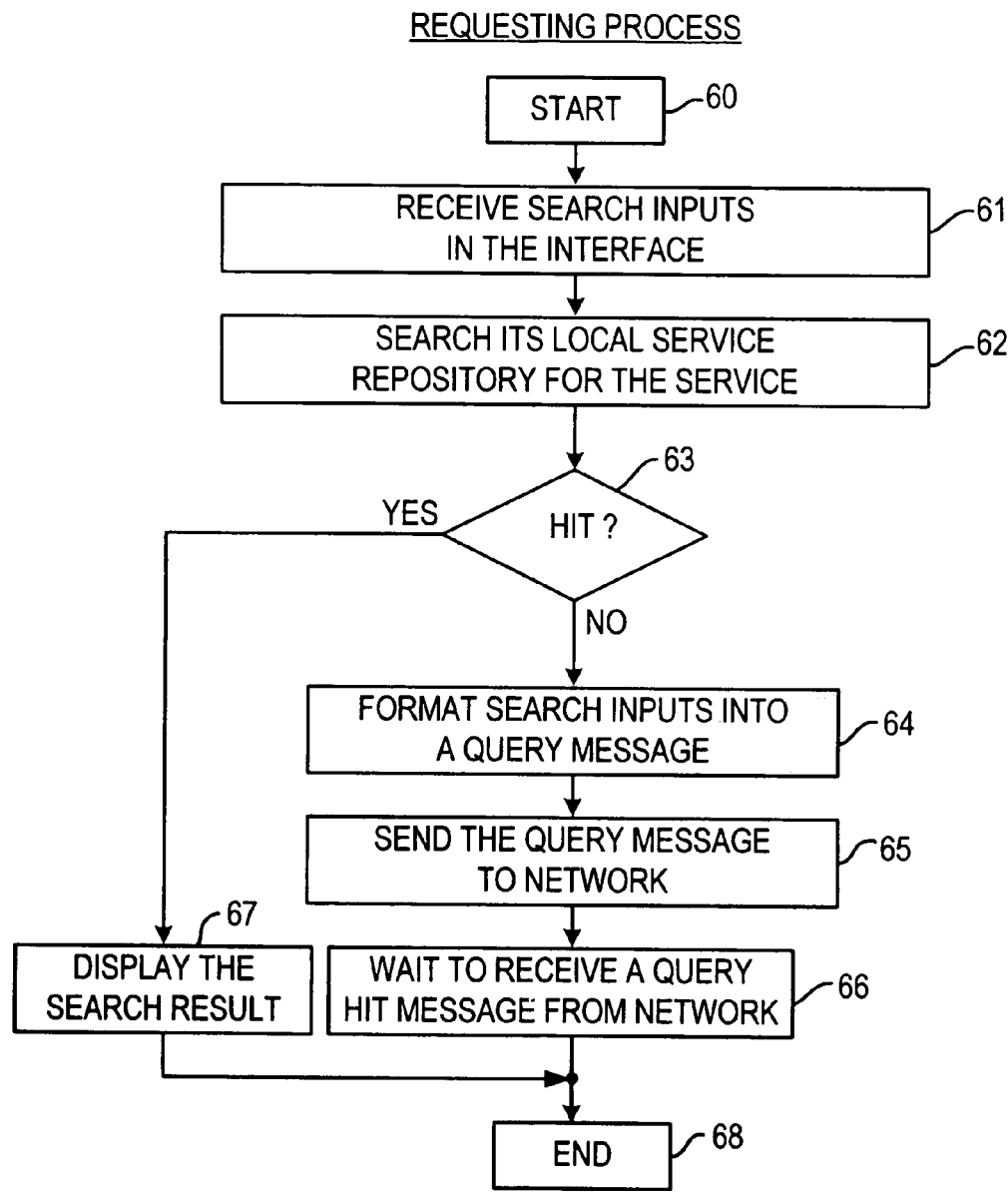
FIG. 6 shows the process by any of the service search nodes of FIG. 2 in sending the a formatted service search query message.

FIG. 6 show in flowchart diagram form the process of a service search node (i.e., any one of the nodes 31–33 of the network system 20 of FIG. 2) in requesting a service. As can be seen from FIG. 6, the process starts at the step 60. At the step 61, the requesting node receives the service search inputs that describe the service to be searched or discovered. At the step 62, the search engine of the requesting node uses the service search inputs to search its local service repository for the requested service. This is to determine if the requested service is in the local service repository of the requesting node. In addition, the search engine of the requesting node stores any search result received from the local service repository.

If the requested service is found in the local repository (i.e., a "hit" message is returned) at the step 63, then the process moves to the step 67, at which the search result is displayed. If, on the other hand, the requested service is not found in the local repository at the step 63, the step 64 is performed, at which the formatting module of the requesting node formats the service search inputs into a formatted service search query message (shown in FIG. 5). At the step 65, the formatted query message is sent to other nodes of the network (i.e., the network 20 of FIG. 2) via its connected node or nodes. This means that if the requesting node is the node 31 in FIG. 2, the query message is sent to the network 20 via the file search node 21. If the requesting node is the service search node 32, then the query message is sent to the network 20 via the nodes 23–24 and 32. At the step 66, the requesting node waits to receive a query hit return message from a service search node in the network that contains the requested service. The process then ends at the step 68.

Figure 7:
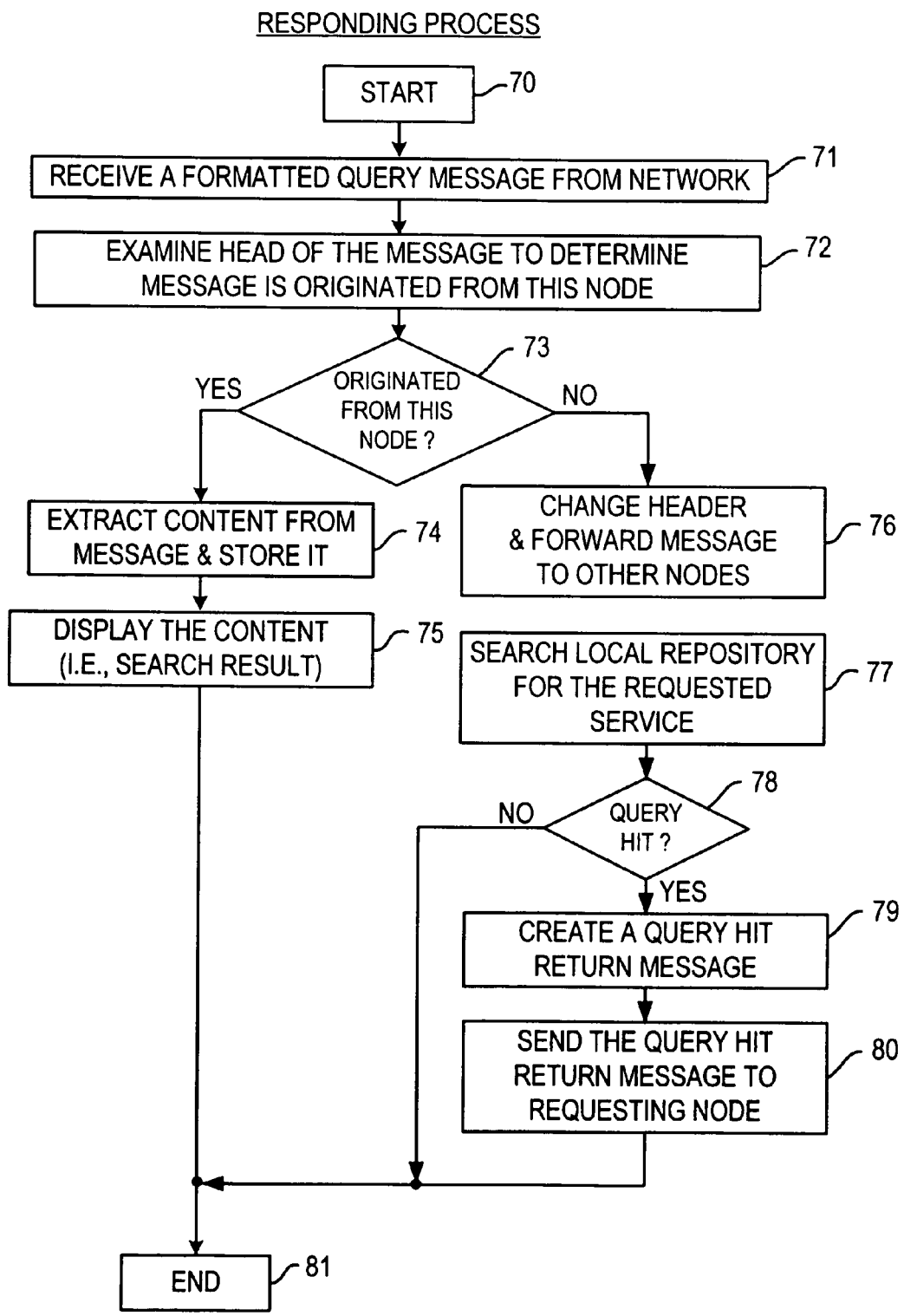
FIG. 7 shows the process by any of the service search nodes of FIG. 2 in responding to a service search query message.

FIG. 7 shows in flowchart diagram form the process of a service search node in responding to a formatted message. In this case, the service search node can be the requesting service search node, a forwarding service search node, or a responding node (i.e., the service search node that contains the requested service). In addition, the formatted message can be a service search query message, a query hit return message, or other messages.

As can be seen from FIG. 7, the process starts at the step 70. At the step 71, the node receives the formatted message from one of the nodes connected to this node. At the steps 72–73, the formatting module of the node examines the message header of the message to determine whether the message is originated from this node. This is done by examining (1) the sending node ID field and (2) the payload descriptor field of the message header.

If the message is originated from this node (meaning the message is a query hit return message for this node), then the step 74 is performed, at which the content of the query message is extracted and stored. Then the content (i.e., the search result) is displayed at the step 75. The process then ends at the step 81.

If, at the step 73, it is determined that the message is not originated from this node (i.e., the message is a query message), then the step 76 is performed, at which the formatting module of the node changes the message header and, if the changed message header still indicates that the query message needs to be forwarded, allows the node to forward the query message to other nodes. In this case, the formatting module changes the TTL (i.e., Time-To-Live) descriptor in the message header, and if the modified TTL data is still greater than zero, allows the query message to be forwarded to other nodes. As described above, the TTL descriptor specifies how many nodes through which the message will be propagated. If the TTL value is greater than zero (meaning that the query message needs to be propagated more), then the node needs to send the query message to the network.

At the step 77, the content of the query message is extracted from the message and is used to by the search engine of the node to search the local service repository of the node for the service described in the query message. If, at the step 78, a query hit message is received from the local service repository (meaning that the service repository stores the requested service), then the step 79 is performed, at which the search engine of the node extracts content from the query hit message from the local service repository. In addition, the formatting module of the node causes (1) the payload descriptor in the message header and (2) the content of the received query message to be changed to create a query hit return message that will be forwarded back to the requesting service search node. Then the query hit return message is sent back to the requesting node at the step 80, following the same transmission path of the query message.

If, on the other hand, no query hit message is determined to be received from the local service repository at the step 78, then the process ends at the step 81.

In the foregoing specification, the invention has been described with reference to specific embodiments thereof. The specification and drawings should, however, be regarded in an illustrative rather than a restrictive sense.

What is claimed is:

1. A computer implemented method for searching services in a search network that includes a plurality of file search and service search nodes, comprising:
   receiving a service search request for a specific service of the services in a first service search node coupled to one file search node of the file search nodes;
   formatting the service search request into a format recognized by the file search nodes in the first service search node, said formatting the service search query further comprises adding a header to the service search query so the service search query appears to be a file search query that is recognizable by the file search nodes;
   propagating the formatted service search request to a second service search node via some of the file search nodes, wherein the second service search node contains a local service repository that stores only the services searchable by the service search request;
   extracting descriptive information from the formatted service search request in the
   second service search node, wherein the formatted service search request contains
   sufficient descriptive information of the specific service;
   searching the local service repository of the second service search node for the specific service;
   re-constructing, by the second service search node, the formatted service search query back to the service search query before said searching the service search query at the local service repository; and
   returning a search result that includes the specific service to the first service search node.

2. The method of claim 1, further comprising the step of searching a local service repository for the specific service associated with the first service search node before propagating the formatted service search request to the second service search node.

3. The method of claim 1, further comprising the step of searching a local service repository for the specific service associated with the first service search node while propagating the formatted service search request to the second service search node.

4. The method of claim 1, further comprising extracting search result from a returned message from the second service search node;
   forwarding the search result to the searcher.

5. The method of claim 1, wherein the service is an electronic service.

6. A service search network system, comprising
   a plurality of file search nodes coupled together, wherein each file search node of the file search nodes has a file repository that stores only files searchable with a file search request;
   a first and a second service search nodes, each having a service repository for storing only services, wherein the first service search node receives a service search request for a specific service stored in the second service search node, the first service search node formats the service search request into a format recognized by the file search nodes such that the service search request is propagated to the second service search node via some of the file search nodes, the first service search node formats the service search request by adding a header to the service search query so the service search query appears to be a file search query that is recognizable by the file search nodes and wherein a search engine in the second service search node extracts descriptive information from the formatted service search request that contains sufficient descriptive information of the specific service, searches a local service repository of the second service search node for the specific service, re-constructs, by the second service search node, the formatted service search query back to the service search query before said searching the service search query at the local service repository and, returns a search result that includes the specific service to the first service search node.

7. The service search network system of claim 6, wherein the first service search node further comprises
   a user interface that receives the service search request;
   a formatting module that formats the service search request into a format recognized by the file search nodes;
   a search engine that propagates the formatted service search request to the second service search node through some of the file search nodes.

8. The service search network system of claim 7, wherein the search engine of the first service search node also accesses its associated local service repository for the specific service while propagating the formatted service request to the second service search node.

9. The service search network system of claim 7, wherein the search engine of the first service search node searches its local service repository for the specific service before propagating the formatted service search request to the second service search node.

10. The service search network system of claim 7, wherein the search engine extracts search result from a returned message from the second service search node, and forwards the search result to the searcher via the user interface.

11. The service search network system of claim 6, wherein the second service search node further comprises a search engine that accesses its associated local service repository for the specific service when receiving the propagated and formatted service search request.

12. The service search network system of claim 6, wherein the service is an electronic service.

13. A computer implemented method for searching electronic services, comprising:
    receiving, at a first service search node, a service search query for electronic services, the service search query not searchable by file search nodes, wherein each file search node of the file search nodes has a file repository that stores only files searchable with a file search request;

searching the service search query at a first service repository associated with the first service search node;

formatting the service search query to a format recognizable by the file search nodes, the formatting the service search query further adding a header to the service search query so the service search query appears to be a file search query that is reconizable by the file search nodes;

propagating the formatted service search query from at least one file search node to a second service search node;

extracting, by a search engine in the second service search node, descriptive information from the formatted service search query that contains sufficient descriptive information of a specific service;

searching a second service repository of the second service search node for the specific service, wherein the second service repository stores only the electronic services;

re-constructing, by the second service search node, the formatted service search query back to the service search query before said searching the service search query at the second service repository; and returning a search result that includes the specific service to the first service search node.

14. The method of claim 13 wherein the first and second service search nodes search for electronic services and not electronic files.

15. The method of claim 13 wherein the first and second service search nodes search for electronic modular services that can work together.

16. The method of claim 13 wherein the file search nodes cannot respond to a search query for services but can respond to a search query for files.

17. A computer implemented method for searching electronic services, comprising:

receiving, at a first service search node, a service search query for an electronic service of the electronic services, the service search query not searchable by file search nodes, wherein each file search node of the file search nodes has a file repository that stores only files searchable with a file search request;

searching the service search query at a first service repository associated with the first service search node;

if the electronic service is not found at the first service repository, then formatting the service search query to a format recognizable by the file search nodes, the formatting the service search query further adding a header to the service search query so the service search query appears to be a file search query that is recognizable by the file search nodes;

propagating the formatted service search query from at least one file search node to a second service search node;

extracting, by a search engine in the second service search node, descriptive information from the formatted service search query that contains sufficient descriptive information of a specific service;

searching a second service repository of the second service search node for the specific service, wherein the second service repository stores only the electronic services;

re-constructing, by the second service search node, the formatted service search query back to the service search query before said searching the service search query at the second service repository; and returning a search result that includes the specific service to the first service search node.

18. The method of claim 17 wherein the at least one file search node cannot search content contained in the search request.

* * * * *

UNITED STATES PATENT AND TRADEMARK OFFICE
CERTIFICATE OF CORRECTION

PATENT NO. : 7,243,091 B2  Page 1 of 1
APPLICATION NO. : 10/135906
DATED : July 10, 2007
INVENTOR(S) : Vasiliki Kalogeraki et al.

It is certified that error appears in the above-identified patent and that said Letters Patent is hereby corrected as shown below:

In column 9, line 65, in Claim 4, after "to" delete "the" and insert -- a --, therefor.

In column 10, line 1, in Claim 6, after "A" insert -- computer implemented --.

In column 10, line 1, in Claim 6, after "comprising" insert -- : a processor; --.

In column 10, line 51, in Claim 10, after "to" delete "the" and insert -- a --, therefor.

In column 10, line 63, in Claim 13, after "for" insert -- the --.

In column 11, line 7, in Claim 13, delete "reconizable" and insert -- recognizable --, therefor.

Signed and Sealed this

Twenty-eighth Day of April, 2009

JOHN DOLL
*Acting Director of the United States Patent and Trademark Office*